(No Model.)
R. & E. BRENT.
WHEEL HUB.
No. 473,904.  Patented May 3, 1892.
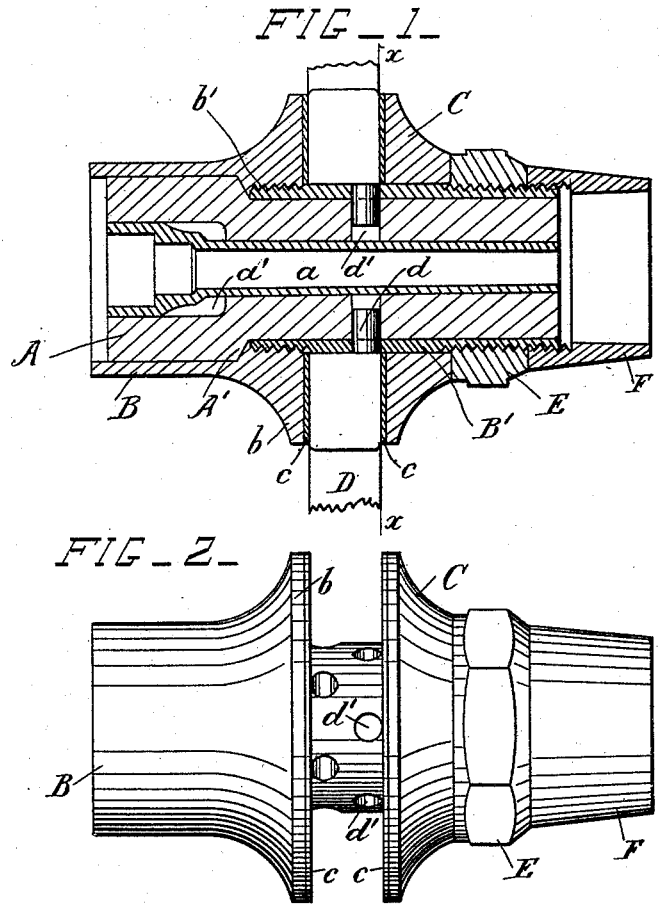
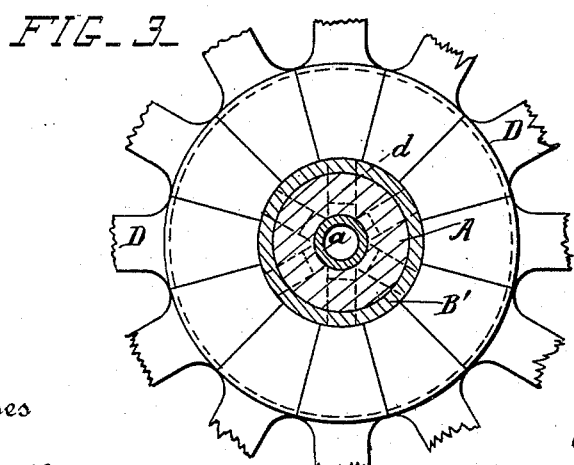
Witnesses
John Cullen
Albert Popkins
Inventors.
Richard Brent, and
Edwin Brent.
By their Attorney
Herbert W. T. Jenner.
THE NORRIS PETERS CO., PHOTO-LITHO., WASHINGTON, D. C.

UNITED STATES PATENT OFFICE.

RICHARD BRENT AND EDWIN BRENT, OF WILKES-BARRÉ, PENNSYLVANIA.

WHEEL-HUB.

SPECIFICATION forming part of Letters Patent No. 473,904, dated May 3, 1892.

Application filed November 18, 1891. Serial No. 412,317. (No model.)

*To all whom it may concern:*

Be it known that we, RICHARD BRENT and EDWIN BRENT, citizens of the United States, residing at Wilkes-Barré, in the county of Luzerne and State of Pennsylvania, have invented certain new and useful Improvements in Wheel-Hubs; and we do hereby declare the following to be a full, clear, and exact description of the invention, such as will enable others skilled in the art to which it appertains to make and use the same.

This invention relates to wheels for vehicles; and it consists in the novel construction and combination of the parts hereinafter fully described and claimed.

In the drawings, Figure 1 is a longitudinal section through a wheel-hub constructed according to this invention. Fig. 2 is a side view of the wheel-hub. Fig. 3 is a cross-section taken on the line $x\ x$ in Fig. 1.

A is the body of the hub, which is made of wood, and $a$ is the metallic box for the axle, driven tightly into the said body and provided with lugs $a'$ or other approved means for preventing it from turning. The wheels are finished complete with the wooden bodies, and the said bodies are subsequently bored out to suit any desired size or shape of box. The body A is provided with a shoulder A', and B is one portion of a metallic tube, which is shrunk on or otherwise tightly secured upon the larger end of the body A, and has the back flange $b$ formed integral with it.

B' is the other portion of the tube, which encircles the smaller end of the body A and is provided with the screw-threaded portion $b'$ for securing it tightly to the larger portion B. The two portions B and B' of the tube can be formed of one solid piece of metal, if desired, instead of making the tube in the form of two tubes B and B' and uniting them by a screw-threaded portion, as shown.

C is the front flange, which slides upon the tube B', and $c$ are washers, of india-rubber, arranged between the said flanges and the spokes D. The spokes D are shaped to bear against each other, as shown in Fig. 3, and are provided with projections $d$ on their lower ends. These projections engage with staggered holes $d'$ in the tube B' and in the hub-body A.

E is a nut, which engages with the screw-threaded portion $e$ on the tube B', and F is the nose-band, which also engages with the said portion $e$ and locks the nut E after it has been tightened up to press the india-rubber washers tightly against the spokes.

The nut and the nose-band may be made of various approved forms, and the india-rubber washers may be dispensed with, if desired, or washers of any other soft material may be used instead of india-rubber washers.

What we claim is—

1. In a wheel-hub, the combination, with the wooden body portion adapted to receive the metallic box, of a metallic tube secured upon the said body and provided with a back flange, the wheel-spokes provided with projections extending through holes in the said tube into the said body portion, a sliding front flange, and a nut on the end of the tube for securing the spokes between the said flanges, substantially as set forth.

2. In a wheel-hub, the combination, with the wooden body portion adapted to receive the metallic box and provided with a shoulder near one end, of a metallic tube formed of two portions, the larger of the two said portions being provided with the back flange and secured against the shoulder on one end of the said body portion and having the smaller portion screwed into it, the wheel-spokes provided with projections extending through holes in the smaller portion of the tube into the said body portion, the front flange sliding on the said smaller portion of the tube, and the nut for pressing the said front flange against the spokes, substantially as set forth.

3. In a wheel-hub, the combination, with the wooden body portion adapted to receive the metallic box, of the metallic tube secured upon the said body portion and provided with the back flange, the wheel-spokes provided with projections extending through holes in the said tube into the said body portion, a front flange sliding on the tube, the washers interposed between the said flanges and the spokes, and the nut and the nose-band for securing the said spokes between the said flanges, substantially as set forth.

In testimony whereof we affix our signatures in presence of two witnesses.

RICHARD BRENT.
EDWIN BRENT.

Witnesses:
DAVID COTTLE,
STANLEY W. GROVER.